(12) United States Patent
Schmitz et al.

(10) Patent No.: US 9,895,735 B2
(45) Date of Patent: Feb. 20, 2018

(54) METHOD FOR JOINING TWO METAL STRIP ENDS

(71) Applicant: Otto Junker GmbH, Simmerath/Lammersdorf (DE)

(72) Inventors: Klaus Schmitz, Simmerath-Kesternich (DE); Robert Brull, Monschau-Konzen (DE); Alexander Ruttgers, Simmerath-Rollesbroich (DE)

(73) Assignee: Otto Junker GmbH, Simmerath/Lammersdorf (DE)

( * ) Notice: Subject to any disclaimer, the term of this patent is extended or adjusted under 35 U.S.C. 154(b) by 574 days.

(21) Appl. No.: 14/374,439

(22) PCT Filed: Dec. 3, 2012

(86) PCT No.: PCT/EP2012/074222
§ 371 (c)(1),
(2) Date: Jul. 24, 2014

(87) PCT Pub. No.: WO2013/110379
PCT Pub. Date: Aug. 1, 2013

(65) Prior Publication Data
US 2014/0366359 A1    Dec. 18, 2014

(30) Foreign Application Priority Data

Jan. 25, 2012  (DE) .......................... 10 2012 100 629

(51) Int. Cl.
*B21C 47/24* (2006.01)
*B21D 35/00* (2006.01)
(Continued)

(52) U.S. Cl.
CPC .......... *B21D 35/001* (2013.01); *B21C 47/247* (2013.01); *B21J 13/08* (2013.01);
(Continued)

(58) Field of Classification Search
CPC .......... Y10T 29/49833; Y10T 29/5397; B21D 35/001; B21J 15/32; F16B 5/04
See application file for complete search history.

(56) References Cited

U.S. PATENT DOCUMENTS 585,835 A      6/1897   Steen, Jr.
1,079,996 A  * 12/1913  Holstein ................. G07F 11/24
                                                 221/131
(Continued)

FOREIGN PATENT DOCUMENTS

CN       1409659 A    4/2003
CN     101767251 A    7/2010
(Continued)

*Primary Examiner* — Sarang Afzali
*Assistant Examiner* — Ruth G Hidalgo-Hernandez
(74) *Attorney, Agent, or Firm* — The Webb Law Firm

(57) ABSTRACT

A method and a device are provided for joining the ends of strips with two or more surfaces arranged flat on top of each other, more particularly metal sheets that can be coiled, in order to draw these successively through a treatment or machining system. It is provided that the strip ends are joined by means of a plurality of eyelets arranged essentially transversally to the strip direction, wherein initially all holes are simultaneously punched in a first stroke and then all eyelets are pressed in a second stroke. The device has a clamping device and a machining unit, which has a working tool with a plurality of punching and pressing tools, wherein the working tool and a die are displaceable by the distance between two neighboring individual tools and wherein above the punching and pressing tools, a pressing device is provided.

4 Claims, 3 Drawing Sheets

(51) Int. Cl.
   *B21J 15/04*     (2006.01)
   *B21J 15/10*     (2006.01)
   *B21J 13/08*     (2006.01)
   *F16B 5/04*      (2006.01)

(52) U.S. Cl.
   CPC ............ *B21J 15/046* (2013.01); *B21J 15/10* (2013.01); *F16B 5/04* (2013.01); *Y10T 29/49833* (2015.01); *Y10T 29/5397* (2015.01)

(56) References Cited

U.S. PATENT DOCUMENTS

| | | | |
|---|---|---|---|
| 3,276,112 | A | 10/1966 | Tantlinger et al. |
| 4,001,542 | A * | 1/1977 | McCormick ........... B21D 31/02 219/103 |
| 4,391,037 | A | 7/1983 | Giasini |
| 5,858,835 | A | 1/1999 | Lin |
| 6,759,622 | B1 | 7/2004 | Zinsen |
| 2009/0107205 | A1 | 4/2009 | Renius et al. |
| 2010/0163604 | A1 | 7/2010 | Noe et al. |

FOREIGN PATENT DOCUMENTS

| | | | | |
|---|---|---|---|---|
| DE | 1839921 | U * | 10/1961 | ........... B21C 47/265 |
| DE | 4334194 | A1 | 4/1995 | |
| DE | 19959090 | A1 | 6/2001 | |
| EP | 0029415 | A2 | 5/1981 | |
| GB | 291684 | | 6/1928 | |
| JP | 46077649 | | 8/1971 | |
| JP | 63140710 | A | 6/1988 | |
| JP | 1295013 | A | 11/1989 | |
| JP | 471785 | A | 3/1992 | |
| JP | 10303567 | A | 11/1998 | |
| JP | 2000301400 | A | 10/2000 | |
| KR | 20030092432 | A | 12/2003 | |

* cited by examiner

METHOD FOR JOINING TWO METAL STRIP ENDS

CROSS-REFERENCE TO RELATED APPLICATIONS

This application is the United States national phase of International Application No. PCT/EP2012/074222 filed Dec. 3, 2012, and claims priority to German Patent Application No. 10 2012 100 629.6 filed Jan. 25, 2012, the disclosures of which are hereby incorporated in their entirety by reference.

BACKGROUND OF THE INVENTION

Field of the Invention

The invention relates to a method and a device for joining the ends of sheets, with two or more surfaces arranged flat on top of each other, more particularly metal strips that can be coiled, in order to draw these successively through a treatment or machining system.

Description of Related Art

Metal sheets that can be coiled (strips or foils) are, in the most varied of treatment or machining processes, initially coiled and subsequently recoiled. This takes place for example in rolling mills, in annealing furnaces, in degreasing lines, in cleaning lines, in pickling lines, in coating lines, in stretching installations or similar. The sheets are supplied in the wound form, as a so-called coil, unwound in the input area in order to pass through the system and, following processing, at the end of the system rewound to form a coil again.

If the coil on the input side comes to an end, it is necessary to join the end of this with the start section of a fresh coil, which is then also drawn through the various processing points in the system by the strip end already in the system as it continues passing through. Since this usually takes place in a continuous process, the join must be created in the shortest time possible, since the systems frequently have only a relatively small strip store and a system standstill is to be avoided.

EP 0 029 415 A2 discloses how to create an interlocking connection between the ends of strips, wherein by means of piercing punches in the overlapping area a number of cruciform cuts are created and the resultant flaps between two cross-shaped incisions provided with two-layer flanging. This leads to four-layer connection points and thus, in particular when punching cross-shaped incisions, to relatively rigid strip sections which are not readily able to pass through all systems.

It has therefore also previously been proposed (DE 199 59 090 A1), to provide the overlapping ends of two metal sheets with ring-shaped welded joints at a distance from the ends of the sheets. This results in the merging of the strip material in the area of the holes, creating the required stability.

A further known device (GB-PS 291 684) serves to join the ends of thin foil sheets, for example of aluminium foil. Here, in the overlapping area of the sheet ends, a roller provided with a plurality of electrodes is lowered onto the sheet, wherein the electrodes in the area of a counter roller with corresponding openings pierce the sheet and by means of a voltage applied between the electrodes and the sheet the ends are electrically welded together.

SUMMARY OF THE INVENTION

The object of the invention is to improve and develop the method and device described above in more detail for high tensile strength joining of preferably metal sheets in such a way that a rapidly performed and inexpensive join between two overlapping end sections of metal strips is created, which is resistant to high tensile loads, chemical attacks in particular from alkaline solutions, acid or solvents and high temperatures considerably in excess of 300° C., up to 1,100° C. At the same time the joint should be as flat as possible and have no sharp edges, in order to avoid damaging guide elements, in particular deflection rollers in the machining line. It is furthermore desirable that the join is suitable in particular also for joining two different materials and for joining essentially very difficult to work materials, such as for example as-rolled metal sheets.

As regards the method, the object is achieved in that the sheet ends are joined together by means of a plurality of eyelets arranged essentially transversally to the direction of the strip, wherein initially all holes are simultaneously punched in one stroke and then all eyelets are simultaneously pressed in a second stroke.

In terms of the device, the object is achieved in that the machining unit has a work tool with a plurality of punching and pressing tools arranged alternately in a line with the same spacing and a die as the counter tool, in that the tool and the die are displaceable in the direction of the line by the distance between two neighbouring individual tools and in that above the punching and pressing tools a pressing device is provided.

According to the invention a method and a device are proposed with which the sheets in the overlapping area are initially punched in a first stroke and then in a second stroke joined with special eyelets in these holes. For this purpose the two overlapping strip ends are initially fixed in their position with clamping devices and then with one stroke simultaneously a plurality of holes arranged in a row are punched in the overlapping strips. With a second drive the work tool and a corresponding die provided below the strip are displaced in such a way that with the next stroke it is not the punching tools but the joining tools that are used, at exactly the same positions that previously the holes were punched in fact. Simultaneously with this displacement movement on the tool-holder the eyelets are introduced by means of a guide rail into the working area of the joining device. With the second stroke that now follows the eyelets are pressed into the holes and the strips joined in this way.

The clamping devices are released and the "fresh" strip is drawn into the machining system with the preceding strip. Production of the joint can also take place in continuous operation. For this purpose the systems have a strip store in the input area, ensuring the feeding of the strip into the machining system, while the strip end is briefly halted.

A further teaching of the invention provides that the punching and pressing of the eyelets takes place by alternate operation of punching and pressing tools arranged alternately in a line and that the work tool used for this is displaced horizontally in its longitudinal direction to switch between punching and pressing. In this way the joining process can take place relatively quickly and with the movement of only relatively small masses. The two stroke functions (punching and pressing) are preferably undertaken by a single shared drive. This reduces the construction effort on the device according to the invention.

A further development of the invention provides that the eyelets are fed to the pressing tools during the punching process. Here use is made of the fact that due to the alternating strokes the pressing tools are in the idle position during the punching process, so that the simultaneous feeding of the eyelets can take place here.

According to a further teaching of the invention, the arrangement of the eyelets runs vertically to the strip direction. As an alternative, however, it is also possible for the arrangement of the eyelets to run transversally to the strip direction, wherein the angle of the eyelets arranged in line can be freely selected. This is useful, for example, if different strip widths have to be processed, so that the eyelets can always be arranged with an even distribution over the width of the strip. Furthermore, a transversal arrangement of the eyelets can be an advantage if it is desired that not all eyelets are to be fed simultaneously via sensitive deflection rollers into the system. In addition, in this way the number of eyelets in a strip can be increased without the need to alter the spacing of the eyelets. This also reduces the construction effort.

According to a further configuration of the invention a shared drive is provided for both stroke functions and for switching between punching and pressing of the eyelets the work tool is designed to be displaceable in its longitudinal direction. For this purpose the pressing device is preferably designed as a press crosshead operating jointly on all punching and pressing tools in use. For a further reduction in the construction effort it is provided that the press crosshead has a number of pressure rams which by displacement of the work tool operate only the punching tools or the pressing tools, respectively.

A further teaching of the invention provides that the die arranged below the punching or pressing tools is provided with alternately arranged holes or moulds corresponding to the punching or pressing tools for deforming the eyelets.

Finally, a further configuration of the invention provides that for feeding of the eyelets into the respective press areas a feed device is provided which for example can be designed as a feed rail or bar.

BRIEF DESCRIPTION OF THE DRAWINGS

The invention is explained in more detail below by means of a drawings showing just one preferred embodiment. The drawings are as follows.

DESCRIPTION OF THE INVENTION

Figure 1:
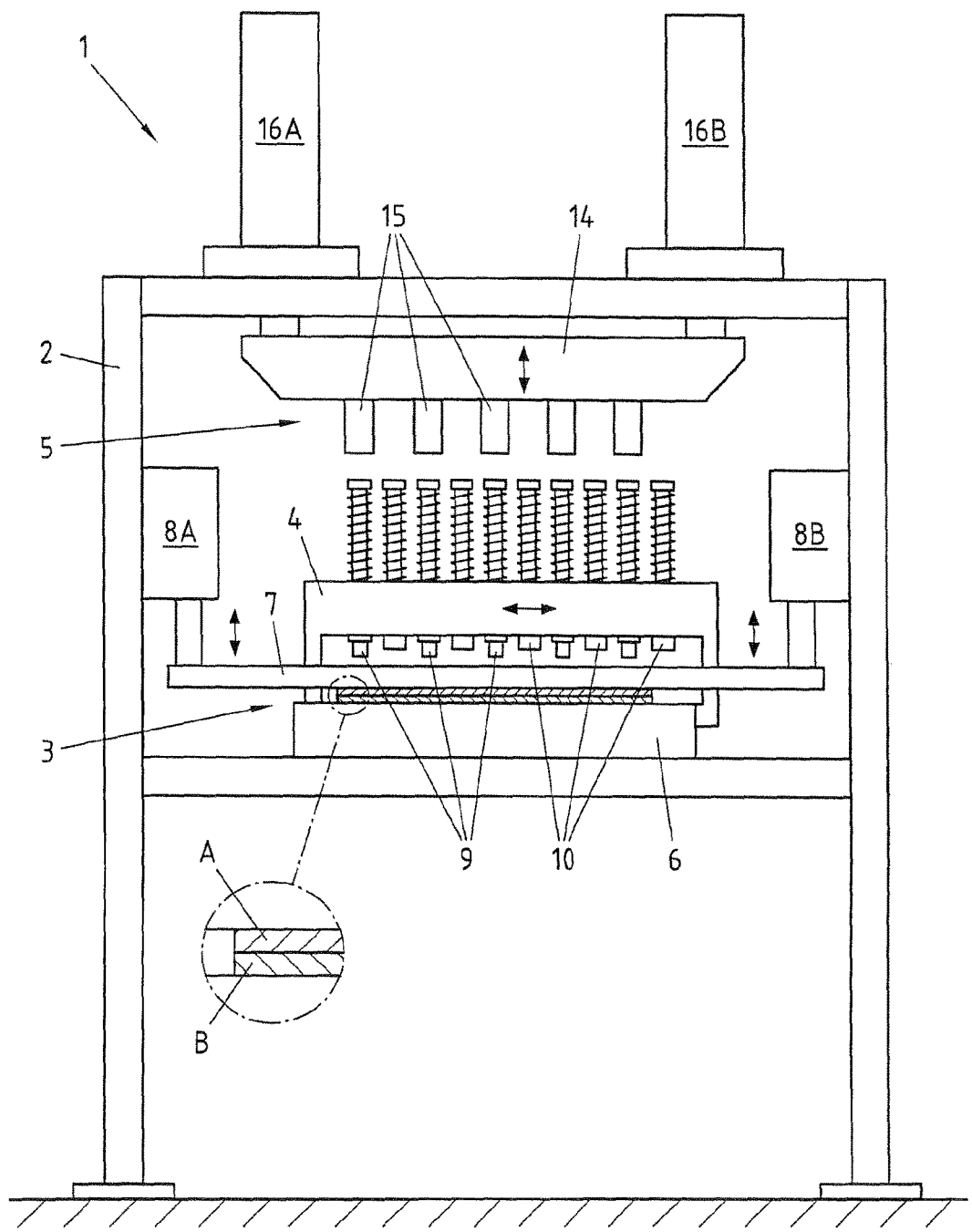
FIG. 1 a schematic side view in the direction of the longitudinal axis of the strips, of a device according to the invention for joining two sheet ends, FIGS. 2A and 2B the work tool of the device from FIG. 1 in the punching position (first stroke) or pressing position (second stroke), FIG. 3 a first sheet join produced with the device according to the invention, and FIG. 4 a further sheet join produced with the device according to the invention.

FIG. 1 is a schematic representation of a device 1 according to the invention for joining the ends of sheets A and B with two or more surfaces arranged flat on top of each other in a horizontal plane, more particularly mid-placed metal strips. For this purpose the device 1 first has a frame 2, to which the individual units are secured.

A clamping device 3 is used for securing the sheet ends A and B, which is preferably arranged either side of the area of the eyelets to be fitted. Behind this a work tool 4 is located and above this a pressing device 5. Here the clamping device 3 first has an immobilised support block 6, on which the ends of the strips A and B are placed. A clamping bar 7, which via the corresponding drives 8A and 8B is able to travel vertically, ensures the necessary contact pressure of the strip ends and allows different strips thicknesses.

In the embodiment shown, and in that sense preferred, the work tool 4 has five punching tools 9 and five pressing tools 10, arranged alternately in line one behind the other. The work tool 4 can be moved by a drive (not shown) in the horizontal direction transversally to the longitudinal axis of the strip, as shown by the double arrow.

Figure 2A:
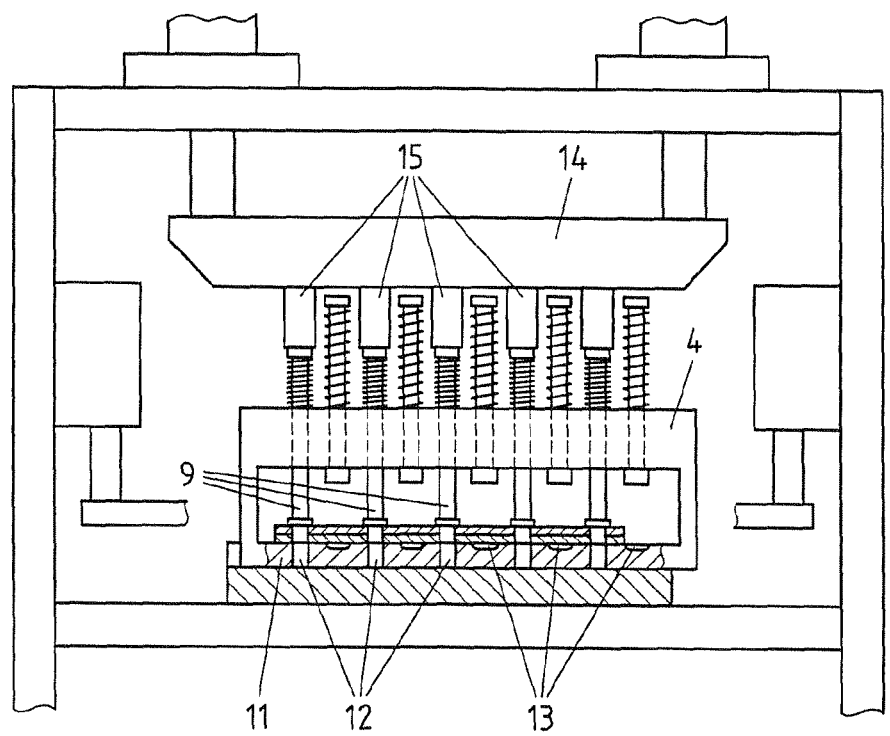
Figure 2B:
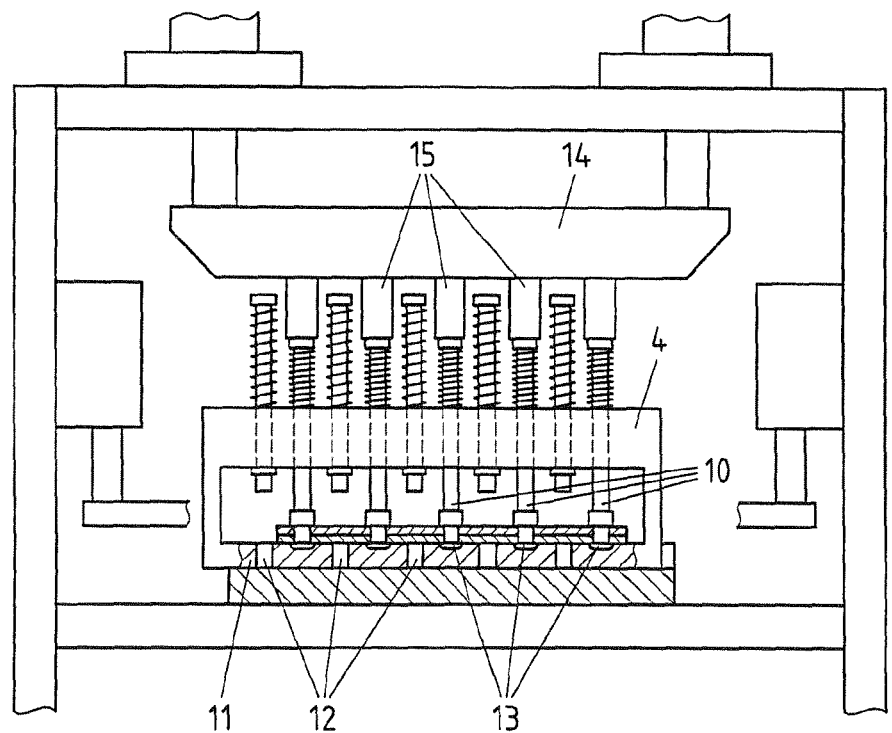

Since in FIG. 1 the clamping tool 3 obstructs the view of the work tool 4, the work tool 4 is shown exposed in FIGS. 2A and 2B. Here it will be noticed firstly that below the work tool 4 a die 11 connected with this is arranged, provided with holes 12 or moulds 13 arranged alternately according to the punching or pressing tools 9, 10 for deforming the eyelets.

FIG. 1 also shows that how the pressing device 5 firstly has a horizontal press crosshead 14 above the work tool 4, on which five pressure rams 15 protruding downwards are provided, the spacing of which is selected in such a way that depending on the position of the work tool 4 it corresponds with the punching tools 9 or the pressing tools 10. Here the press crosshead 14 can be vertically displaced in order to apply the necessary contact pressure and has pressure applied by two drives 16A and 16B preferably designed as cylinder-piston devices.

According to the invention in two strokes with a single pressing device 5 in a first step a plurality of holes are to be stamped in the ends of the strips A and B (FIG. 2A) and in a second step eyelets pressed into the stamped holes in order to join the strip ends (FIG. 2B). For a better illustration the die 11 is shown cut open in FIGS. 2A and 2B. Here the holes 12 provided below the punching tools 9 are clearly visible in the embodiment shown with the work tool 4 travelling to the right. The pressing is shown in FIG. 2B, where below the pressing tools 15 with the work tool 4 travelling to the left corresponding moulds 13 are arranged, which together with the corresponding moulds of the pressing tools 10 perform the deformation of the eyelets.

FIGS. 1 and 2 also show how the individual punching tools 9 or pressing tools 10 are arranged to move vertically in the work tool 4, wherein in each case a spring not described further ensures that the tools after the machining process are moved back from their machining position to their idle position. This representation is for illustration purposes only, in practice for the return movement of the tools active support measures can also be provided.

It is clear to see that with the device 1 according to the invention a relatively quick join can be achieved of the ends of two strips A and B, without large masses having to be moved to do so. Between the individual strokes only the work tool 4 horizontal has to be displaced horizontally by the distance between two tools, in order then, as with the first stroke, to be able to be operated by the pressing device 5.

Figure 3:
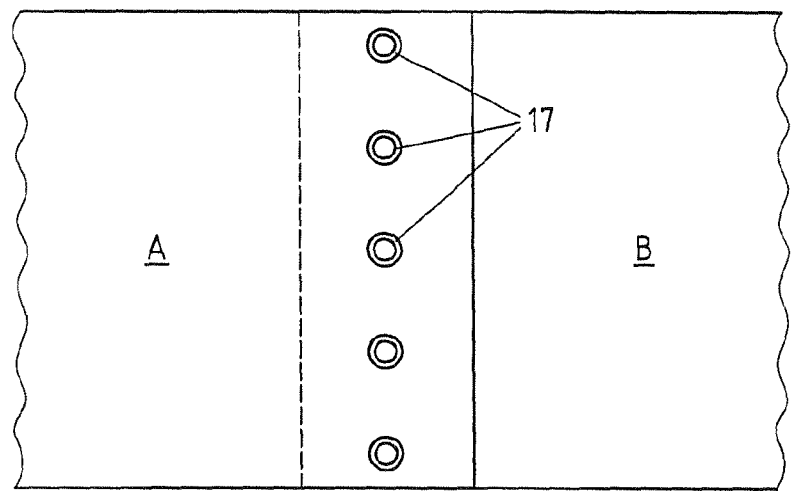
Figure 4:
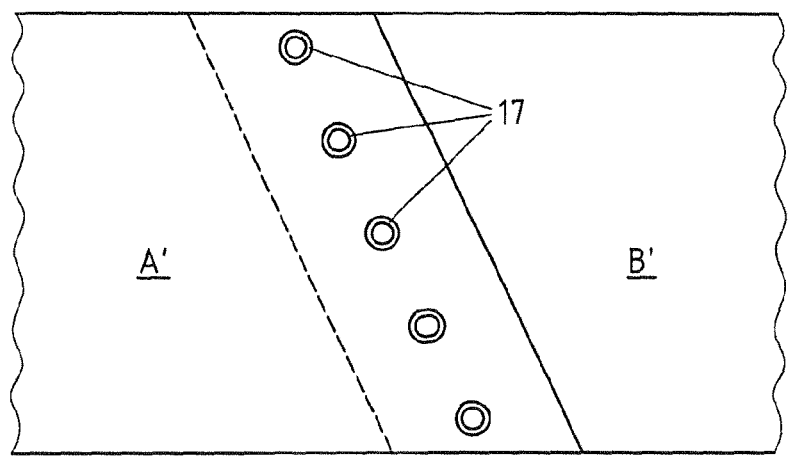

Finally, in FIGS. 3 and 4 the strip joins produced by the device according to the invention are again shown. Here the arrangement of eyelets with reference 17 according to FIG. 3 moves vertically in relation to the strip direction. The disadvantage of the fixed distance between punching tools 9 and pressing tools 10, which on first sight might be assumed in connection with use with differing strip widths is overcome in that at least the clamping device 3, the work tool 4 and the pressing device 5 can be rotated about a vertical axis. If the strip width is so small that only 3 or 4 of the five eyelets 17 shown engage with a vertical arrangement, this is not a problem since the tools extending beyond the side edges of the strip are not working on anything. If the strip width varies, however, in an area in which an eyelet has been designed to be too close to the edge of the strip ends or would even project over the edge, then by tilting the tools or preferably the entire frame 2 about a vertical axis smooth adjustment is possible, as shown in FIG. 4 for the narrow strips A' and B'. For this reason the device according to the invention is suitable not only for strips of any strip thickness but also of any strip width.

It is expressly stated that the invention is not restricted to the embodiment shown, but that in the context of performance of the method according to the invention a number of other configurations are possible for achieving the desired effect, without moving away from the fundamental concept of the present invention.

The invention claimed is:

1. A method for joining ends of as-rolled metal sheets that can be coiled with two or more surfaces arranged flat on top of each other, in order to draw the metal sheets successively through a treatment or machining system, comprising:
   joining ends of the metal sheets together by a joining structure having a plurality of eyelets arranged essentially transversally to a direction in which the metal sheets are drawn through the treatment or machining system,
   wherein initially punching tools simultaneously punch a plurality of holes in a first stroke and then pressing tools simultaneously press a plurality of eyelets into the plurality of holes in a second stroke,
   the punching and pressing tools are arranged alternately in a line, and
   punching of the plurality of holes and pressing of the plurality of eyelets takes place by alternate operation of the punching and pressing tools via a shared work tool that is displaced horizontally in a longitudinal direction between the punching of the plurality of holes in the first stroke and the pressing of the plurality of eyelets in the second stroke.

2. The method according to claim 1, wherein the plurality of eyelets are fed to the pressing tools during the punching of the plurality of holes.

3. The method according to claim 1, wherein the plurality of eyelets are arranged in a line perpendicular to the direction in which the metal sheets are drawn through the treatment or machining system.

4. The method according to claim 1, wherein the plurality of eyelets are arranged in a line at an angle to the direction in which the metal sheets are drawn through the treatment or machining system.

* * * * *